United States Patent
Sedlmeier

(10) Patent No.: US 6,543,095 B2
(45) Date of Patent: Apr. 8, 2003

(54) FASTENER

(75) Inventor: Andreas Sedlmeier, Ummendorf (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/933,958

(22) Filed: Aug. 21, 2001

(65) Prior Publication Data

US 2002/0093197 A1 Jul. 18, 2002

(30) Foreign Application Priority Data

Aug. 22, 2000 (DE) .......................... 100 40 983

(51) Int. Cl.[7] ................................. F16L 33/00
(52) U.S. Cl. ..................... 24/20 R; 24/21; 24/16 R; 285/252; 285/420
(58) Field of Search ..................... 24/23 R, 20 EE, 24/205, 21, 20 R, 16 R; 285/252, 365, 407, 409, 420

(56) References Cited

U.S. PATENT DOCUMENTS

| | | | |
|---|---|---|---|
| 185,959 A | * | 1/1877 | Petty .............................. 24/21 |
| 2,822,198 A | | 2/1958 | Priestman |
| 2,922,212 A | * | 1/1960 | Textrom ...................... 24/20 R |
| 2,985,917 A | * | 5/1961 | Sunday ........................ 24/16 R |
| 4,543,691 A | * | 10/1985 | Calmettes ................... 24/20 R |
| 5,518,332 A | | 5/1996 | Kotoh |
| 5,865,476 A | * | 2/1999 | Kramer .................. 285/252 X |
| 5,926,922 A | * | 7/1999 | Stottle ......................... 24/23 R |

FOREIGN PATENT DOCUMENTS

| | | | | |
|---|---|---|---|---|
| DE | 3805340 | * | 9/1989 | ................. 285/365 |
| GB | 726157 | | 3/1955 | |

* cited by examiner

Primary Examiner—Lynne H. Browne
Assistant Examiner—David E. Bochna
(74) Attorney, Agent, or Firm—Sidley Austin Brown & Wood, LLP

(57) ABSTRACT

A fastener, such as for pipe clamps, has two parts, to be connected with one another, and a movable fastening part, one part being formed by an elongated strip (2) with at least one stop. The second part has a plate (4) extending transversely of the strip with an opening (5), the width of which corresponds at least to the width of the strip (2) and of the stop. The fastening part is formed as a spring clip (7) and has at least one spring leg (6), movable against a spring force out of the width region of the strip (2) and of the stop. To make a fastener available, which is as user friendly and economical as possible, the spring leg (6) can be moved out of the width region of the strip (2) and of the stop by a rotational movement about an axis of rotation arranged approximately parallel to the insertion direction of the strip (2) through the opening (5) in the plate (4).

9 Claims, 2 Drawing Sheets

FASTENER

FIELD OF INVENTION

The invention relates to a fastener, especially for pipe clamps, with two parts, which are to be connected to one another, and with a movable fastening part, one part essentially having a strip with at least one stop and the second part having a plate with an opening having a width which corresponds at least to the width of the strip and of the stop and the fastening part being movable against a spring force out of the width of the strip and of the stop.

BACKGROUND INFORMATION AND PRIOR ART

Fasteners of the type under discussion here are used particularly for fastening objects to ceilings, walls, floors and the like. Frequently, access to the fastening locations is extremely difficult for the installing personnel. Furthermore, the overhead installation requires the use of considerable force. For these reasons, it should be possible to install such fasteners very easily. Especially for fastening pipes with the help of pipe clamps, it should be possible for the operator to close the pipe clamp with only one hand, since the pipes, which are to be installed, generally are bulky objects, which in some cases are also difficult to fasten.

A fastener of the type mentioned is known, for example, from the EP 0597805 B1 in conjunction with pipe clamps and has two parts, which are to be connected together. The one part has a strip with stops and the other part a plate with an opening for the strip with the stops. A locking element, connected by a joint to the plate, covers part of the opening and is mounted so that it can be swiveled away from the opening against the force of a spring. The axis of rotation of the locking element extends parallel to the surface of the plate. In order to produce the spring force, a spring element is provided, which is supported at the locking element and at the plate. The locking element covers the opening to such an extent, that the part, which remains free, corresponds to the axial projection of the strip without stops.

If this strip is passed through the opening, covered by the locking element, the latter swivels away about the axis of rotation. After reaching the end position of the strip, which is passed through the opening, the locking element swivels back, at the same time gripping behind the corresponding stops. In order to loosen the fastener, the stop must be moved back so far, that it lies outside of the circle area of the locking element, which can be swiveled about the axis of rotation. This is very disadvantageous when the pipe clamp is being dismantled from the pipe, since the force, which must be applied by the installing personnel, is very large. Under some circumstances, the known fastener cannot be opened any more at all, since the stop no longer can be moved back the necessary distance. Furthermore, it is expensive to manufacture the known fastener since the latter consists of several parts. This has a negative effect economically.

OBJECT OF THE INVENTION

It is an object of the present invention to create a fastener, which can be opened and closed in a simpler and user-friendly manner and, in addition, can be produced economically.

SUMMARY OF THE INVENTION

Pursuant to the invention, this objective is accomplished owing to the fact that the locking part is constructed as a spring clip and has at least one spring leg, which rests on the surface of the plate, opposite the inlet side of the pipe clamp, and is located partially in the width region of the strip and of the stop and can be moved out of the width region of the strip and of the stop by a rotational movement about an axis of rotation, formed approximately parallel to the insertion direction.

Owing to the fact that the movable spring leg rotates parallel to the surface of the stop, the strip does not have to be moved counter to the insertion direction when the fastener is opened. If need be, this measure can be taken up in order to reduce the friction between the spring leg and the surface of the stop. In addition, it is easier and, with that, more economical to manufacture the fastener, especially the locking part, since it is constructed in one piece by a spring clip. The one-part construction also has a positive effect on a reliable and user-friendly handling.

Advisably, two stops are provided opposite to one another on the strip and the spring clip is constructed essentially U-shaped, the two ends of the spring clip being formed by legs of the spring, which are disposed parallel to one another and rest on the surface of the plate, opposite the inlet side. As a result of the thereby possible symmetrical construction of the fastener, there is an optimum distribution of load and, consequently, the load carrying capacity of the fastener is high. Because the load is distributed over two legs of the spring, the locking part can also be constructed from a material of lesser thickness, as a consequence of which the locking part is installed more easily and the configuration is more user friendly.

Advisably, the legs of the spring extend outwardly from a free end of the plate, in order to make a clearly visible and easily accessible operating means for loosening the fastener available to the installing personnel.

A leg stop is disposed preferably in the swiveling region of the spring leg, between the opening and the free end of the plate. Accordingly, the fastener can be opened by pressing together the two legs of the spring, extending beyond the free end of the plate, especially when the spring clip is constructed essentially U-shaped. Owing to the fact that the spring legs rotate about the leg stop, they move apart in the region of the opening.and, thus, release the strip with its stops.

The leg stop advantageously is constructed as an impression in the surface of the plate, opposite the inlet, for producing the leg stop economically.

Owing to the fact that advisably the free ends of the spring legs are constructed U-shaped and partially embrace the free end of the plate, the surface, clamped by the U shape parts being perpendicular to the surface of the plate opposite the inlet, the spring clamp is held by friction at the free end of the plate. Due to the configuration described, the installation during the fabrication of the fastener is very simple.

Advantageously, the spring clip is formed from a material with a modulus of elasticity of more than 100 kN/mm$^2$. Accordingly, the spring clip has a high elasticity, which has a positive effect on the reliability and the service life of the fastener.

Preferably, the spring clip is made from a spring steel. This material makes available properties, which are suitable for such stresses and can be processed economically.

In accordance with a further proposal of the invention, the strip has at least two stops, which are disposed behind one another, and the distance between two stops, which are located behind one another, preferably corresponds to one to five times the maximum diameter of the spring leg. As a result, the fastener can be finely adjusted.

BRIEF DESCRIPTION OF THE DRAWING

The invention is described below in greater detail by means of an example and a drawing, in which.

DETAILED DESCRIPTION OF THE INVENTION

Figure 1:
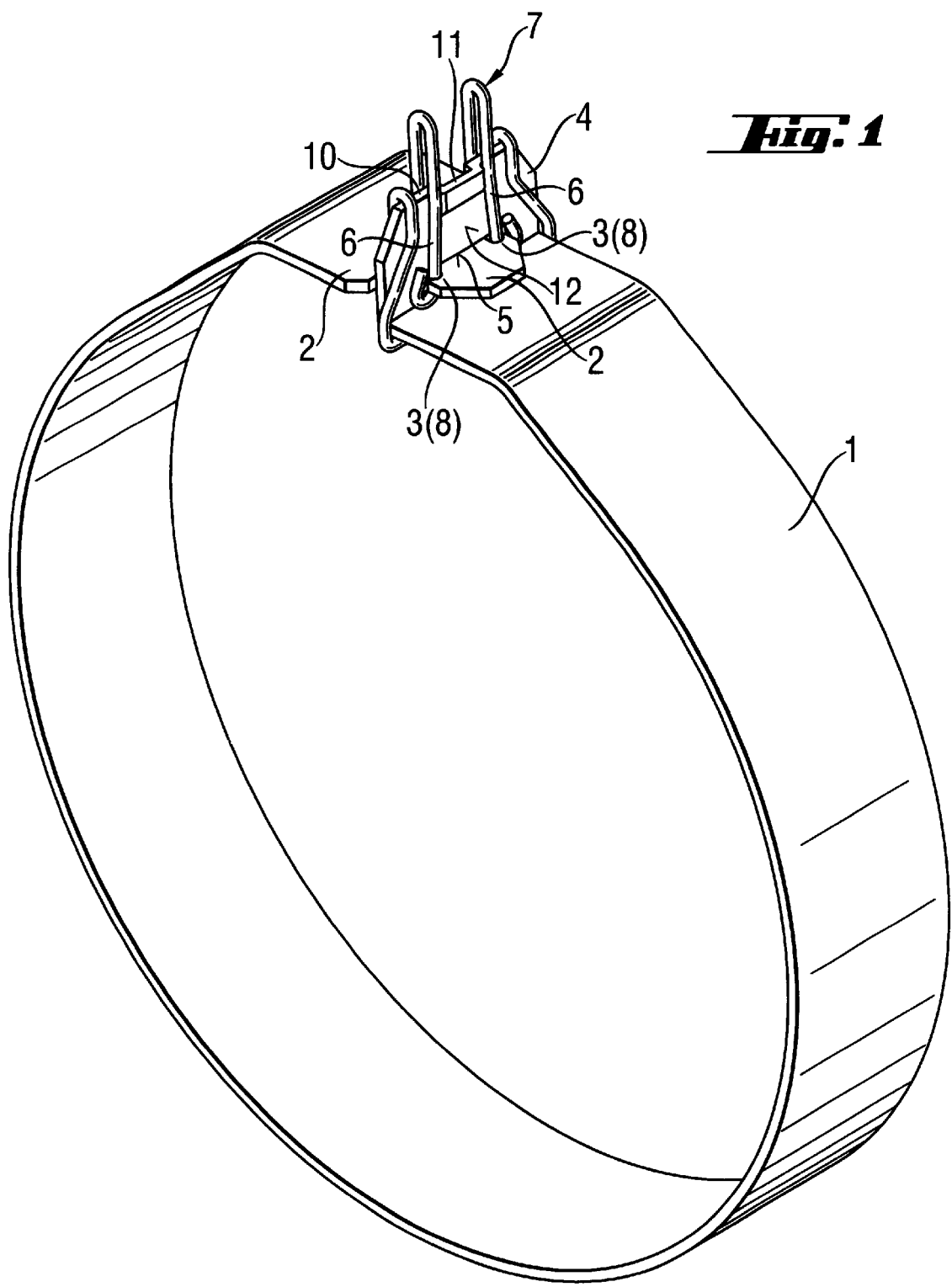
FIG. 1 is a perspective view of a pipe clamp with an inventive fastener in the locked or closed state.
Figure 2:
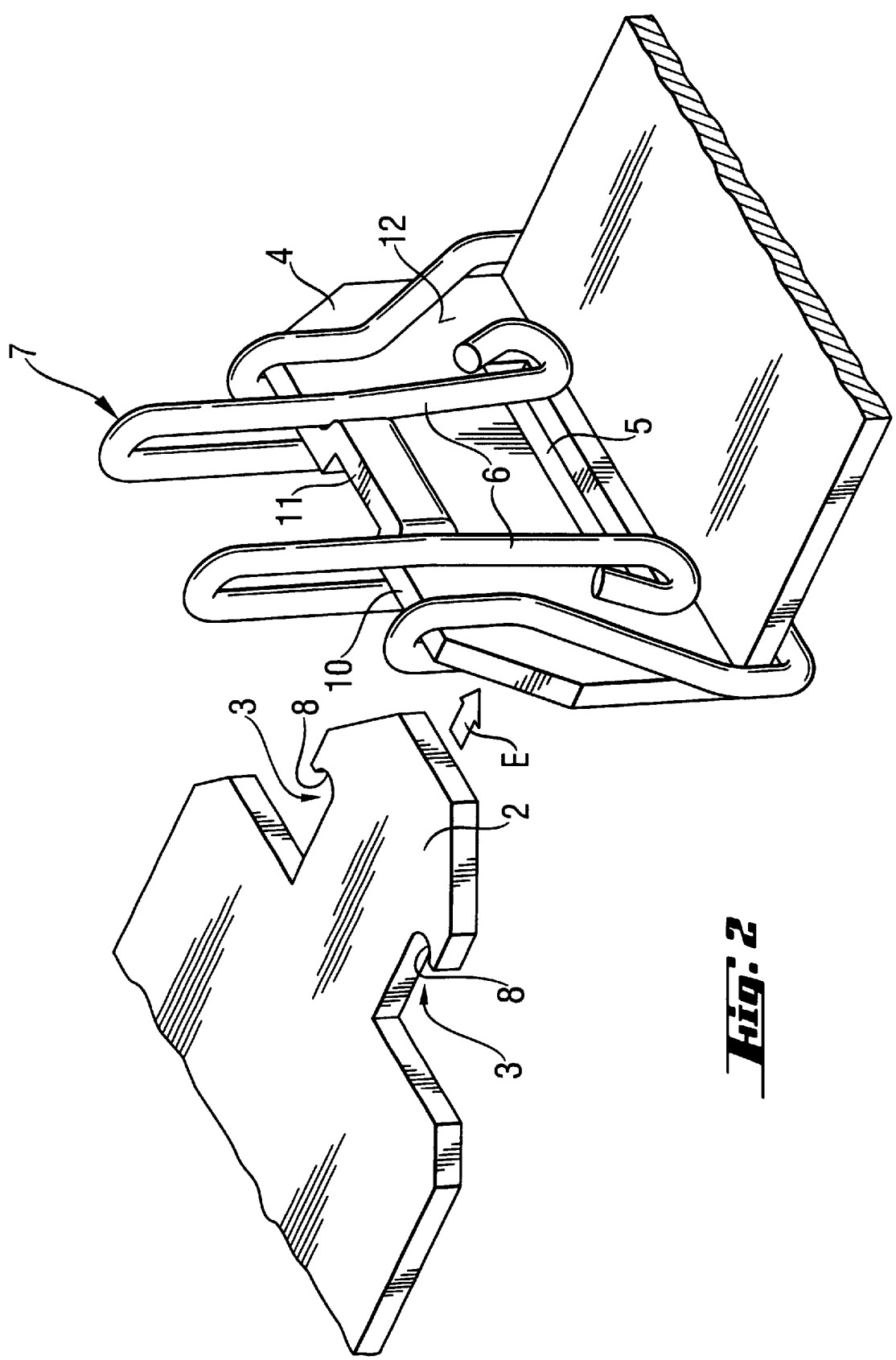
FIG. 2 is partially enlarged representation of the fastener shown in FIG. 1 in an opened state.

FIGS. 1 and 2 illustrate an inventive fastener in the closed and opened states. In FIG. 1, a circular pipe clamp 1 is shown, the opposite ends of which are connected detachably with one another by the fastener. In the opened state, shown in FIG. 2, the opposite ends of the pipe clamp are spaced apart forming an inlet into the clamp. A first end of the pipe clamp 1 has essentially an elongated strip 2 extending generally in the circumferential direction of the clamp, which has a pair of oppositely lying, sawtooth-like projections with stop surfaces 3 for forming stops. The strip 2 may also have several pairs of oppositely lying, sawtooth-like projections in order to configure the connection adjustably. As can be seen particularly in FIG. 2, these sawtooth-like projections are disposed at appropriately constructed edges of the strip and end in a surface extending generally perpendicularly of the strip.

A second end of the pipe clamp 1 has a plate 4, on which an essentially U-shaped spring clip 7 is mounted. The plate 4 extends approximately perpendicularly outward from the circumference of the clamp and is provided with an opening 5, which is covered partly in the width region of the strip 2 and of the stops by the spring legs 6, which are formed by the spring clip 7 and arranged approximately parallel to one another. The two spring legs 6 rest on the surface 12 opposite the clamp inlet. They extend outwardly from the free end 10 of the plate 4, the free ends of the spring legs 6 being formed U-shaped and, moreover, in such a manner that they partially embrace the free end 10 of the plate 4. The surface, clamped by the U-shape part, is perpendicular to the surface 12 of the plate 4, which is opposite the inlet.

When the strip 2 with the stops is introduced into and through the opening 5, the spring legs 6 are moved by the sawtooth-like projections in the insertion direction E, note FIG. 2, against a force of the spring clip 7 out of the width region of the strip 2 and of the stop on the surface 12 of the plate 4. At the same time, the spring force of the spring clip 7 causes the spring leg 6 to move along the sawtooth-like projections. Due to the sawtooth-like configuration of the projections, the spring legs 6, in the event that there is no external force acting, grip in the resting position always behind a stop surface 3 or release the strip 2 with the stops.

In order to make it easy to release the connection, the spring leg 6 extends outwardly from the free end 10 of the plate 4. Between the spring leg 6 and the end region of the free end 10 of the plate 4, a leg stop is disposed on the plate 4 by an impressed surface 11. If now, the two regions of the spring leg 6, extending over the free end 10 of the plate 4, are moved out of a resting position against one another by an external force, then this brings about a rotational movement of the spring leg 6 about the leg stop 11, which results in a swiveling away of the parts of the spring legs 6 in the width region of the opening 5. If the force acting is sufficiently large, the free ends of the spring legs 6 will be outside of the width region of the strip 2 and of the stop, the fastener being opened. If the external force is reduced or even eliminated, the spring leg 6, due to the spring force of the spring clamp 7, moves back into the resting position.

In order to prevent an unintentional release of the fastener, each stop surface 3 advisably has a rounded recess 8, which is shown particularly in FIG. 2. The dimensions of the recess 8 are such that a corresponding spring leg 6 can be brought into it.

What is claimed is:

1. A fastener, for pipe clamps, comprises a first end part and a second end part displaceable between a connected position and an opened position and held in the connected position by a movable fastening part (7), said first end part comprises an elongated strip (2) having a first end and at least one stop (3) spaced in the elongated direction from the first end, said second end part comprises a plate (4) extending transversely of the elongated direction of said strip (2) with an opening (5) having a width extending transversely of the elongated direction of said strip (2) and of said stop (3) and corresponding at least to a width of said strip (2) and stop (3), said strip (2) being movable in an insertion direction (E) corresponding to the elongated direction of said strip, said fastening part (7) being positioned on said plate (4) and being movable against a spring force in said fastening part laterally outward of the width region of said strip (2) and stop, said fastening part (7) comprises a spring clip (7) with at least one spring leg (6) in contact with a surface (12) of said plate (4) located on an opposite side from said strip (2) in the opened position and located partially in the width region of said opening (5) corresponding to the width of said strip (2) and stop and is movable out of the width region of said opening (5) by a rotational movement about an axis of rotation approximately parallel to the insertion direction (E).

2. A fastener, as set forth in claim 1, wherein said strip (2) has two opposite edges extending in the elongated direction, each of said opposite edges has one said stop, said spring clip (7) is formed in a U-shape, said spring clip has a pair of said spring legs (6) arranged approximately parallel to one another and in contact with said surface (12) of said plate (4).

3. A fastener, as set forth in claim 1, wherein said plate (4) has a free end (10) spaced outwardly from said opening (5), and said spring legs (6) extend outwardly from said free end (10) of said plate (4).

4. A fastener, as set forth in claim 3, wherein a leg stop (11) is disposed on said plate (4) between said opening (5) and said free end (10) of said plate (4) where said spring legs are swivelly movable.

5. A fastener, as set forth in claim 4, wherein said leg stop (11) is formed by an impression surface (11) pressed outwardly from said surface (12) of said plate (4).

6. A fastener, as set forth in claim 3, wherein said spring legs (6) are U-shaped and partially embrace the free end (10) of said plate (4), and the U-shaped spring legs (6) clamp a surface (10) arranged perpendicular to said surface (12) of said plate (4).

7. A fastener, as set forth in claim 1, wherein said spring clip (7) is formed of a material having a modulus of elasticity greater than 100 k kN/mm$^2$.

8. A fastener, as set forth in claim 1, wherein said spring clip (7) is formed of spring steel.

9. A fastener, as set forth in claim 1, wherein said strip (2) has at least two said stops spaced apart in the elongated direction of said strip, and the distance between the two said stops spaced apart in the elongated direction is in the range of one to five times a maximum diameter of said spring leg (6).

* * * * *